Patented July 7, 1953

2,644,840

UNITED STATES PATENT OFFICE 2,644,840

OXIDATION OF HYDROCARBONS

David Samuel Petrie Roebuck, Wrexham, Wales, assignor, by mesne assignments, to Monsanto Chemicals Limited, London, England, a British company No Drawing. Application July 7, 1949, Serial No. 103,523. In Great Britain August 7, 1948

6 Claims. (Cl. 260—524)

This invention relates to the oxidation of alkyl aromatic hydrocarbons, and especially methyl- and ethyl-benzenes such as toluene, ethyl benzene itself and the xylenes.

Alkyl aromatic hydrocarbons of this type can be oxidised in the liquid phase by means of gaseous oxygen to give the corresponding oxygenated aromatic compounds, and toluene can be oxidised in this way to benzoic acid and the xylenes to the corresponding toluic and phthalic acids. Ethyl benzene can be oxidised to acetopheneone. The process can for instance be carried out by passing air at atmosphere pressure or under a somewhat increased pressure through the heated hydrocarbon contained in an autoclave and having dispersed through it a suitable oxidation catalyst. Certain metal salts can for example be used as catalysts, such as cobalt, copper or iron salts, and instances of catalysts are organic salts such as the stearates, benzoates, naphthenates, oleates and acetyl acetonates, e. g. cobalt stearate, cobalt benzoate, cobalt naphthenate, cobalt oleate, cobalt acetyl acetonate, copper acetyl acetonate and iron acetyl acetonate.

It is found that an oxidation process of this kind invariably comes to a halt before the oxidation of the side chain or chains is complete, so that the conversion to the oxygenated product is likely to be relatively low. To give an example, if p-xylene is oxidised in this way the reaction might stop when the oxygen absorption by the p-xylene is equivalent to a proportion of it of the order of 30% being oxidised to toluic acid, that is to say when the oxygen absorbed is sufficient to oxidise on an average only 15% of the methyl groups in the xylene to carboxyl. In practice a mixture of oxygenated products would no doubt be present, but this is a convenient method of expressing the stage to which the oxidation is on an average carried forward. The reason for this termination of the oxidation is not fully understood, but it seems possible that phenols are produced in small quantities as by-products in the reaction, and that these phenols poison the catalyst or in some other way bring the reaction to a halt.

The present invention is concerned with a method of inducing the reaction to proceed beyond the point at which it normally comes to a halt, and by promoting the oxidation in this way to increase the production of oxygenated products.

It has in fact now been found that if an inorganic adsorbent, for instance alumina, an alkaline earth oxide, a fuller's earth or kieselguhr, and especially alumina, is introduced into the reaction mixture the oxidation can be made to proceed to a much further extent. The reason for this is not properly understood, but if it is correct that the reaction normally stops on account of the generation of phenolic poisons it may be that the adsorbent has the effect of taking up the phenols and thus removing the poison to some extent at least.

The precise point at which the alumina or other adsorbent is best introduced depends upon the circumstances. Thus in some cases it can be present from the beginning of the oxidation, in some it can be introduced while the reaction is proceeding, and in some it is suitable to introduce it after the oxidation has come to a stop, so that the reaction is reinitiated and continued. It is to be observed also that in certain instances it is quite unsuitable to introduce the adsorbent at the very beginning, since it may then extend the induction period very considerably or even inhibit the oxidation altogether. In this event the reaction must have been initiated before the introduction of the adsorbent. An instance of this has been found when attempting to oxidise p-xylene with air in the presence of a copper acetyl acetonate catalyst, where it was found that although the addition of alumina at the end of the oxidation caused it to begin again, an addition at the beginning prevented it from taking place at all. In another instance, using cobalt acetyl acetonate catalyst, the introduction of alumina at the beginning of the reaction did not prevent the oxidation of the p-xylene but merely slowed down its initiation, though when once begun it continued to the increased extent postulated by the invention. The explanation for this effect may possibly be that the oxidation becomes initiated by the generation of infinitesimal quantities of peroxide initiators, and that these tend to be adsorbed by the alumina and thus removed, even to the extent of preventing the oxidation as a whole from taking place. Whatever the explanation, however, it is easy in any given instance to determine whether or not it is imperative to avoid using the alumina or other adsorbent at any particular stage in the process in order to promote the oxidation in the manner desired.

In a similar way, and perhaps for the same reason, it is possible to add too much of the adsorbent even when it is introduced at a point when it would be expected to further the reaction, and this must of course be avoided. Thus if the adsorbent is added during the reaction, too much of it may stop the reaction altogether, and similarly too great an addition of it introduced when the reaction has halted may prevent reinitiation of the process. Possibly the adsorbent in these instances is present in so great a quantity that it takes up the peroxide excessively as well as removing phenolic poisons. For this reason it may be desirable to introduce the adsorbent in two or more portions at intervals, perhaps a small quantity each time, and in this event each subsequent addition may be made either before or after the reaction has again come to a stop, as it usually will do.

The precise adsorbent suitable for use is also a matter for simple verification in any particular instance. Good results have been obtained using the grade of alumina known as Brockman's Standardised Alumina, which is sold for use in chromatographic separation. There are a variety of methods of introducing the adsorbent, which may for instance simply be added to the reaction mixture, or perhaps supported in a column or tube through which the reaction mixture is passed at intervals or continuously.

The effect of adding an adsorbent such as alumina to the reaction mixture is illustrated by the following two accounts of laboratory tests on a semi-micro scale, using Brockman's Standardised Alumina:

Copper acetyl acetonate catalyst

In this test, 0.5012 gram of p-xylene was oxidised by agitating it in oxygen maintained at a constant pressure of one atmosphere in the presence of 0.0010 gram of the above catalyst, at a temperature of 100° C. The addition of the alumina at the beginning of the reaction would in this instance have prevented the oxidation taking place, but an addition when the reaction had come to a halt caused its reinitiation. Two consecutive additions of alumina were in fact made after the initial stopping of the reaction, the second addition being made when the reaction had again stopped, and the results are indicated in the following table:

| | Steady Rate of Reaction, Mols $O_2$ absorbed per mol xylene per minute | Extent of Oxidation, Mols $O_2$ per mol xylene |
|---|---|---|
| Up to halt of reaction (after 190 minutes) | $7.946 \times 10^{-5}$ | 0.0084 |
| After subsequent addition of 0.0030 gram alumina | $10.330 \times 10^{-5}$ | 0.0232 |
| After subsequent further addition of 0.0032 gram alumina (after 235 further minutes) | $7.186 \times 10^{-5}$ | 0.0110 |
| Total extent of oxidation | | 0.0426 |

The reaction came to a stop 200 minutes after the second addition of alumina.

Cobalt acetyl acetonate catalyst

A similar test was carried out with a cobalt catalyst, using 0.5013 gram of p-xylene and 0.0010 gram of catalyst. Although in this test also no alumina was added until the reaction came to a halt, its introduction at the beginning of the reaction would not have prevented the reaction taking place, but would have reduced the rate of reaction in the initial period.

| | Steady Rate of Reaction, Mols $O_2$ absorbed per mol xylene per minute | Extent of Oxidation, Mols $O_2$ per mol xylene |
|---|---|---|
| Up to halt of reaction (after 160 minutes) | $1.507 \times 10^{-4}$ | 0.0101 |
| After subsequent addition of 0.0029 gram alumina | $2.331 \times 10^{-4}$ | 0.0109 |
| After subsequent further addition of 0.0029 gram alumina (after 55 further minutes) | $1.998 \times 10^{-4}$ | 0.0058 |
| Total extent of oxidation | | 0.0268 |

The reaction came to a stop 50 minutes after the second addition of alumina.

The large increase in the extent to which the oxidation can be carried out by means of the invention is clearly seen from this data on the kinetics of the reaction.

The invention is illustrated by the following examples, on a larger laboratory scale:

Example 1

200 grams of o-xylene were placed in a round-bottomed litre flask fitted with a stirrer and a reflux condenser, and air was bubbled through the xylene, into which 0.4 gram of cobalt acetyl acetonate had been introduced as catalyst. A temperature of 120° C. was maintained.

The air was passed through the xylene for an initial period of 6 hours, whereupon the reaction came to a stop. At the end of the first 1 hour 50 minutes the reaction rate was apparently at a maximum, such that 23% of the oxygen in the air stream was absorbed, but towards the end of the 6 hours the oxygen absorption dropped and at the end of this period had ceased altogether.

A quantity of 1.2 grams of Brockman's Standardised Alumina was then added, and the air passage was continued for 3 hours, after which a further 1.2 grams were added and the air passage continued for a further 2½ hours. In all four consecutive additions of alumina were made, the third and fourth additions of alumina again being 1.2 grams each, air being passed a further 3 hours after the third addition and 2½ hours after the fourth. The air was thus passed through the reaction mixture for a total period of 17 hours. After the first addition of alumina the maximum rate of absorption of oxygen rose to 30% of the oxygen in the air stream, and after the second addition it rose to a maximum as high as 50%.

The reaction mixture was then analysed, and a yield was obtained of 34.58 grams toluic acid
6.15 grams tolualdehyde
13.55 grams high boiling products.

In a similar trial in which the reaction mixture was analysed at the point at which the reaction came to a halt, without any alumina being added, the yield was 17.32 grams toluic acid
11.99 grams high boiling products and no tolualdehyde was found.

Example 2

In a similar way 200 grams of toluene were oxidised in the presence of a cobalt naphthenate catalyst at a temperature of 145° C., under a moderate pressure.

The formation of benzoic acid was similarly increased by the use of the alumina.

Having now particularly described and ascertained the nature of my said invention, and in what manner the same is to be performed, I declare that what I claim is:

1. In the process for the production of oxygenated aromatic compounds by the oxidation of alkyl aromatic hydrocarbons in the liquid phase by means of gaseous oxygen and in which process the said oxidation is first initiated by peroxide initiators and thereafter the said oxidation is inhibited by oxidation inhibiting bodies simultaneously formed therein, the improvement which comprises adding to said liquid phase a solid, inorganic adsorbent in such an amount as to adsorb said oxidation inhibiting bodies but insufficient to adsorb said oxidation promoting bodies, 2. In the process for the production of oxygenated aromatic compounds by the oxidation of alkyl aromatic hydrocarbons in the liquid phase by means of gaseous oxygen and in which process the said oxidation is initiated by peroxide initiators and thereafter the reaction is inhibited by the formation in said liquid phase of oxidation inhibiting bodies, the improvement which comprises conducting said oxidation until said reaction is materially inhibited by the formation therein of oxidation inhibiting bodies, adding to said liquid phase a solid, inorganic adsorbent in such an amount as to adsorb said oxidation inhibiting bodies but insufficient to adsorb said oxidation promoting bodies, and then further oxidizing said alkyl aromatic hydrocarbons.

3. The process defined in claim 1 in which the adsorbent is an adsorbent form of alumina.

4. The process defined in claim 1 in which the adsorbent is fuller's earth.

5. The process defined in claim 1 in which the adsorbent is kieselguhr.

6. In the process for the production of benzoic acid by the oxidation of toluene in the liquid phase by means of gaseous oxygen and in which process the said oxidation is initiated by peroxide initiators and thereafter the reaction is inhibited by the formation in said liquid phase of oxidation inhibiting bodies, the improvement which comprises adding to said liquid phase an adsorbent form of alumina in such an amount as to adsorb said oxidation inhibiting bodies but insufficient to adsorb said oxidation promoting bodies and then further oxidizing said toluene.

DAVID SAMUEL PETRIE ROEBUCK.

References Cited in the file of this patent

UNITED STATES PATENTS

| Number | Name | Date |
|---|---|---|
| 1,284,887 | Gibbs | Nov. 12, 1918 |
| 1,815,985 | Pansegrau | July 28, 1931 |
| 2,245,528 | Loder | June 10, 1941 |
| 2,276,774 | Henke | Mar. 17, 1942 |
| 2,393,240 | Dreyfus | Jan. 22, 1946 |
| 2,479,067 | Gresham | Aug. 16, 1949 |

FOREIGN PATENTS

| Number | Country | Date |
|---|---|---|
| 364,442 | Germany | Nov. 25, 1922 |